July 26, 1932.　　　H. G. REIST　　　1,869,118
BEARING BRACKET FOR DYNAMO ELECTRIC MACHINES
AND THE METHOD OF MAKING THE SAME
Filed April 24, 1930
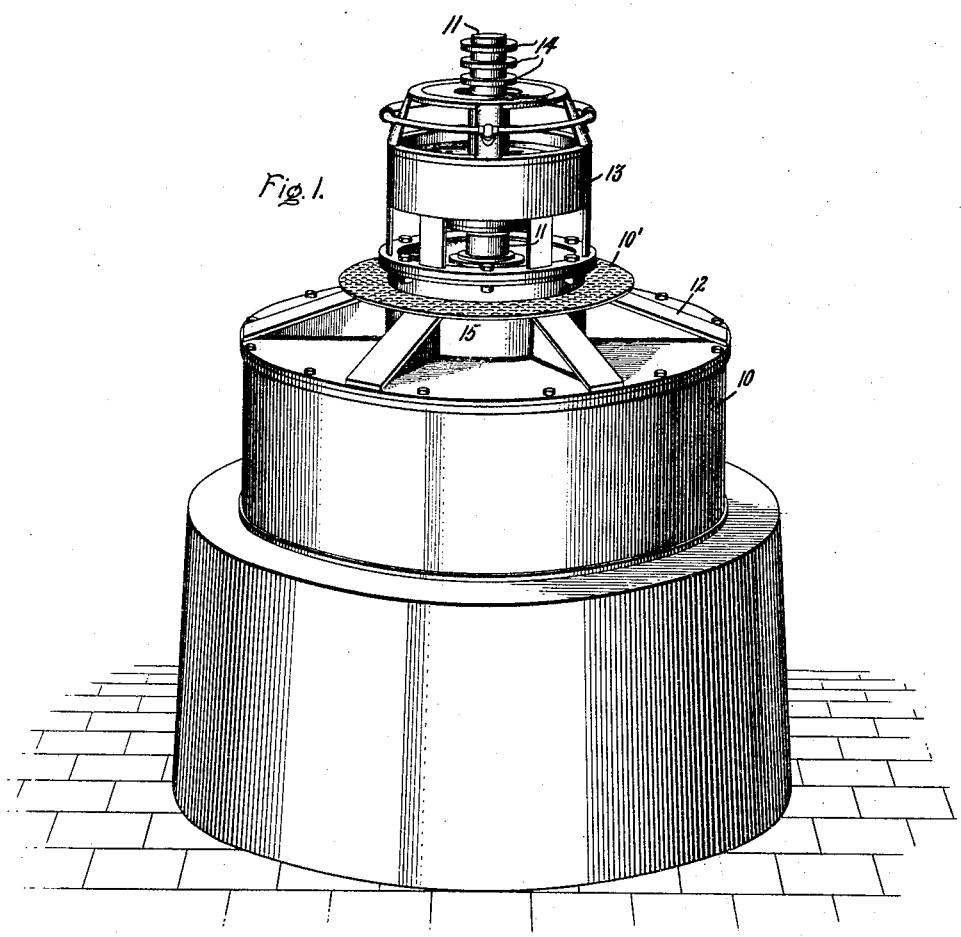
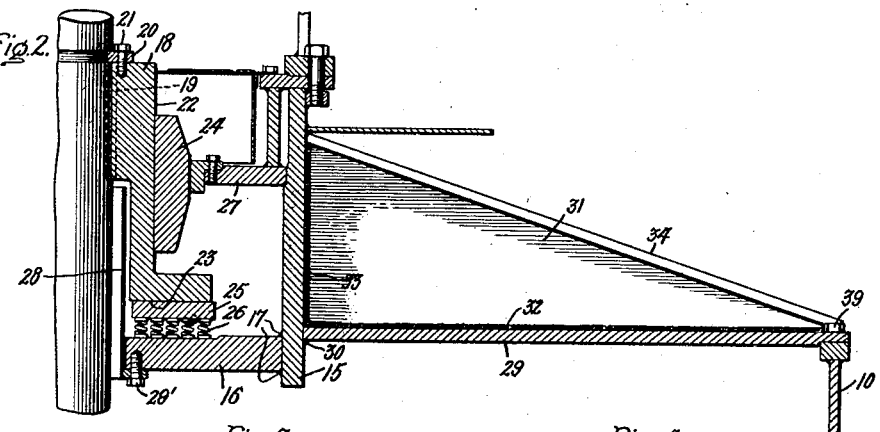
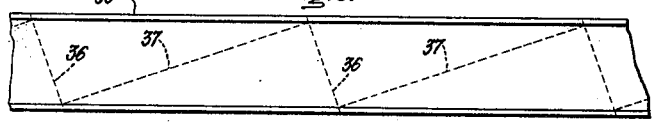
Inventor:
Henry G. Reist,
by Charles V. Tulla
His Attorney.

Patented July 26, 1932

1,869,118

UNITED STATES PATENT OFFICE

HENRY G. REIST, OF SCHENECTADY, NEW YORK, ASSIGNOR TO GENERAL ELECTRIC COMPANY, A CORPORATION OF NEW YORK

BEARING BRACKET FOR DYNAMO-ELECTRIC MACHINES AND THE METHOD OF MAKING THE SAME

Application filed April 24, 1930. Serial No. 447,059.

My invention relates to bearing brackets for dynamo-electric machines, and has for its object the provision of a bearing bracket which is of simple and rugged construction and which can be readily fabricated from plates and structural shapes. I accomplish this by providing a bearing bracket including a central bearing support and a plate secured to the bearing support and extending outwardly therefrom, and radially arranged triangular members attached to the bearing support and the plate.

My invention will be more fully set forth in the following description referring to the accompanying drawing, and the features of novelty which characterize my invention will be pointed out in the claims annexed to and forming a part of this specification.

In the drawing Fig. 1 is a perspective view of a vertical shaft dynamo-electric machine having an upper bearing bracket constructed in accordance with my invention; Fig. 2 is a fragmentary longitudinal section of the bearing support and bearing bracket shown in the machine illustrated in Fig. 1; Fig. 3 is a side elevation of an I-beam which is cut to form the triangular members used in fabricating my improved bearing bracket, and Fig. 4 is an end view of the I-beam shown in Fig. 3.

Referring to the drawing, I have shown my improved bearing bracket in connection with a vertical shaft alternating current generator including a stator frame 10 and a rotor provided with a shaft 11 which is supported in the stator by a combined sleeve and thrust bearing which is carried by a fabricated bearing bracket 12 bolted to the stator frame 10 and having an operator's platform 10'. The shaft 11 of the rotor extends above the bearing bracket and also serves as the shaft of an exciter 13. The collector rings 14 of the generator are arranged on a portion of the shaft 11 extending above the exciter, the current collecting devices being omitted.

In accordance with my invention a simple and rugged bearing bracket construction is provided which can be readily fabricated from plates and structural shapes. I do this by providing a central bearing support which includes a cylinder 15 formed in any convenient manner, having an annular plate 16 welded to the lower portion of the cylinder as indicated at 17 and fitting loosely about the shaft 11. The combined sleeve and thrust bearing employed comprises a bearing member 18 which is keyed to the shaft 11 at 19 and secured against longitudinal movement with respect thereto by an annular key 20 which is bolted thereto at 21. The bearing member 18 is formed with a cylindrical outer surface 22 and a flat surface 23 presented axially of the shaft. The cylindrical surface 22 fits sleeve bearing 24 so as to retain the shaft 11 in accurate alignment with the axis of the machine, and the weight of the rotor and shaft 11 are supported by bearing plates 25 which are supported on the annular plate 16 by springs 26. The sleeve bearing 24 is secured in the central bearing support 15 by a retaining ring 27. A sleeve 28 is bolted to the annular plate 16 at 29', so as to form an oil reservoir about the shaft for lubricating the bearings. The central bearing support of the bearing bracket is connected to the top of the stator frame 10 by an annular plate or disk 29 which is welded to the cylinder 15 at 30, although it will be understood that if desired the plate 29 may be built up of suitable sectors. The plate 29 is reinforced by welding triangular members 31 to the plate at 32, and to the cylinder 15 at 33, and these triangular members are preferably provided with flanges 34 extending from the cylinder 15 to the outer ends of the triangular members. I greatly simplify the manufacture of this construction by cutting the triangular members 31 out of structural shapes in such manner that the webs of the structural shapes form the triangular portions of the members 31 and so that the flanges of the structural shapes will form the flanges 34. This is accomplished with the greatest economy of material by cutting an I-beam 35 with a gas torch, or any other suitable means, on the dotted lines 36 and 37 shown in Fig. 3, the angle between the lines 36 and 37 being such that the triangular pieces cut out of the I-beam will fit the plate 29 and the wall of the cylinder 15. It will be noted that in this way the only waste material is that resulting from making the cuts as indicated. The triangular pieces cut from the I-beam in this manner are welded to the plate 29 and the cylinder 15, as previously described, so that the flange of the I-beam extends from the cylinder to the top of the stator frame. This bearing bracket construction is bolted to the stator frame as indicated at 39 to secure the bearing bracket in place.

Although I have described a particular form of bearing bracket for use in an alternating current generator, I do not desire to be limited thereto, and I intend in the appended claims to cover all modifications which do not depart from the spirit and scope of my invention.

What I claim as new and desire to secure by Letters Patent of the United States is:

1. A bearing bracket for dynamo-electric machines including a central bearing support, a disk secured to said bearing support and extending outwardly therefrom, and a radially arranged triangular section of a structural shape having a flange and a web, said web being secured to said bearing support and to said disk.

2. A bearing bracket for dynamo-electric machines including a central bearing support, an annular plate secured to said bearing support and extending outwardly therefrom, and a radially arranged triangular section of a structural shape having a flange and a web, said web being secured to said bearing support and to said plate, said flange of said triangular member extending from said bearing support to the outer periphery of said plate.

3. A bearing bracket for dynamo-electric machines including a cylindrical bearing support, an annular flat plate secured to said bearing support and extending outwardly therefrom, and a triangular section of a structural shape having a flange and a web, said web being welded to said plate and to said bearing support respectively.

4. The method of making a bearing bracket for dynamo-electric machines having a bearing support, a plate extending outwardly therefrom and radially arranged triangular members including, arranging the plate adjacent the bearing support, cutting triangular members from a flanged beam, and attaching the web portions of said triangular members to said bearing support and said plate respectively.

5. The method of making a bearing bracket for dynamo-electric machines having a bearing support, a plate extending outwardly therefrom and radially arranged triangular members including, welding the plate to the bearing support, cutting triangular members from a beam of I-shaped cross-section, and welding the web portions of said triangular members to said bearing support and said plate respectively.

In witness whereof, I have hereunto set my hand this 23rd day of April, 1930.

HENRY G. REIST.